J. S. BOOTH.
DRIVE WHEEL MOUNTING FOR VEHICLES.
APPLICATION FILED FEB. 10, 1913.

1,077,926.

Patented Nov. 4, 1913.

3 SHEETS—SHEET 1.

Witnesses
Chas W. Stauffiger
Anna M. Dorr.

Inventor
James Scripps Booth,
By
Attorney

J. S. BOOTH.
DRIVE WHEEL MOUNTING FOR VEHICLES.
APPLICATION FILED FEB. 10, 1913.

1,077,926.

Patented Nov. 4, 1913.

3 SHEETS—SHEET 2.

Witnesses
Chas. W. Stauffiger
Anna M. Dorr.

Inventor
James Scripps Booth,
By
Attorneys

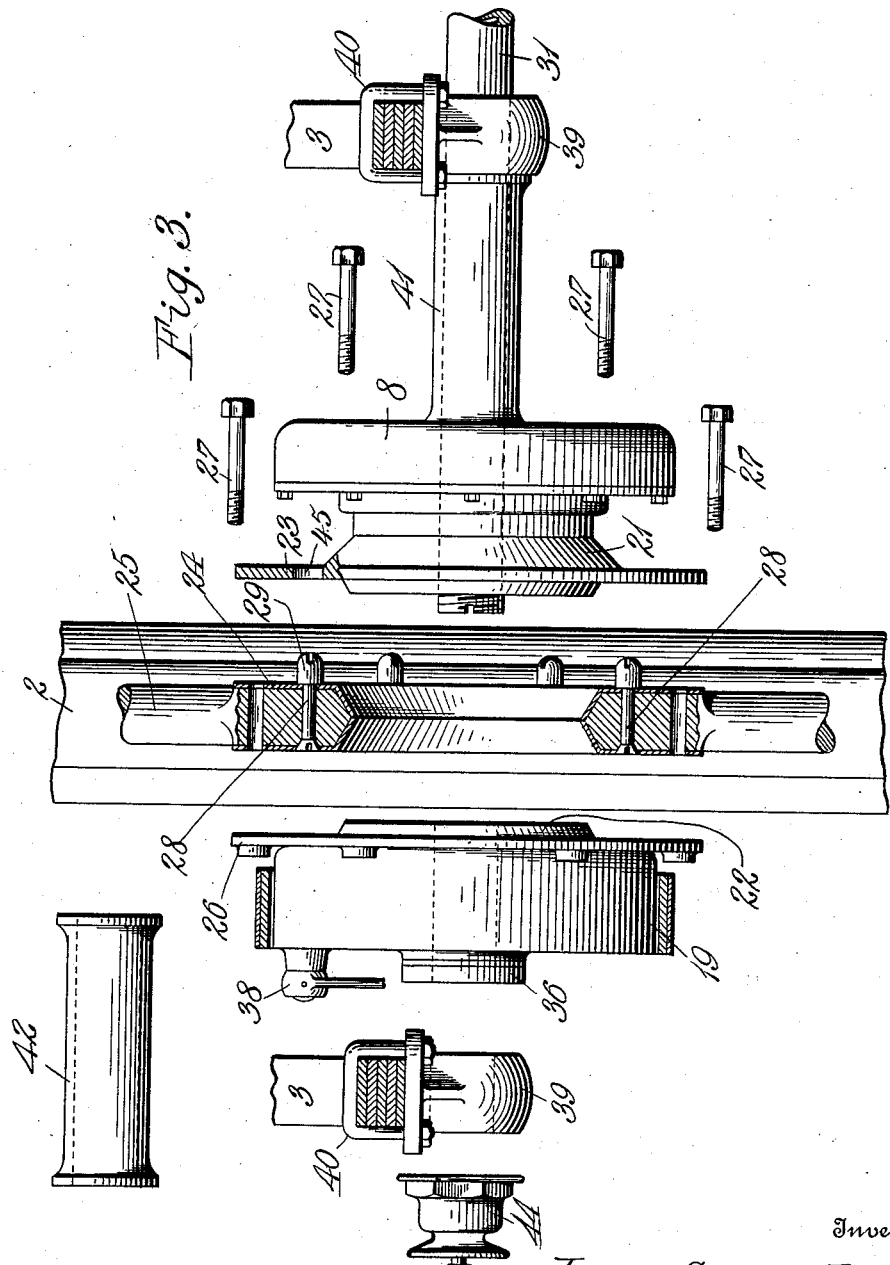

UNITED STATES PATENT OFFICE.

JAMES SCRIPPS BOOTH, OF DETROIT, MICHIGAN.

DRIVE-WHEEL MOUNTING FOR VEHICLES.

1,077,926. Specification of Letters Patent. Patented Nov. 4, 1913.

Application filed February 10, 1913. Serial No. 747,243.

*To all whom it may concern:*

Be it known that I, JAMES SCRIPPS BOOTH, a citizen of the United States of America, residing at Detroit, in the county of Wayne and State of Michigan, have invented certain new and useful Improvements in Drive-Wheel Mountings for Vehicles, of which the following is a specification, reference being had therein to the accompanying drawings.

This invention relates to an axle construction and rear wheel mounting for vehicles having a single driving wheel and its object is to provide a construction which may be easily taken down for the purpose of removing the wheel from its axle and from between the bearing members at each side thereof.

It is also an object of the invention to provide a very simple, compact construction having certain new and useful features in the construction and arrangement of parts.

Figure 1:
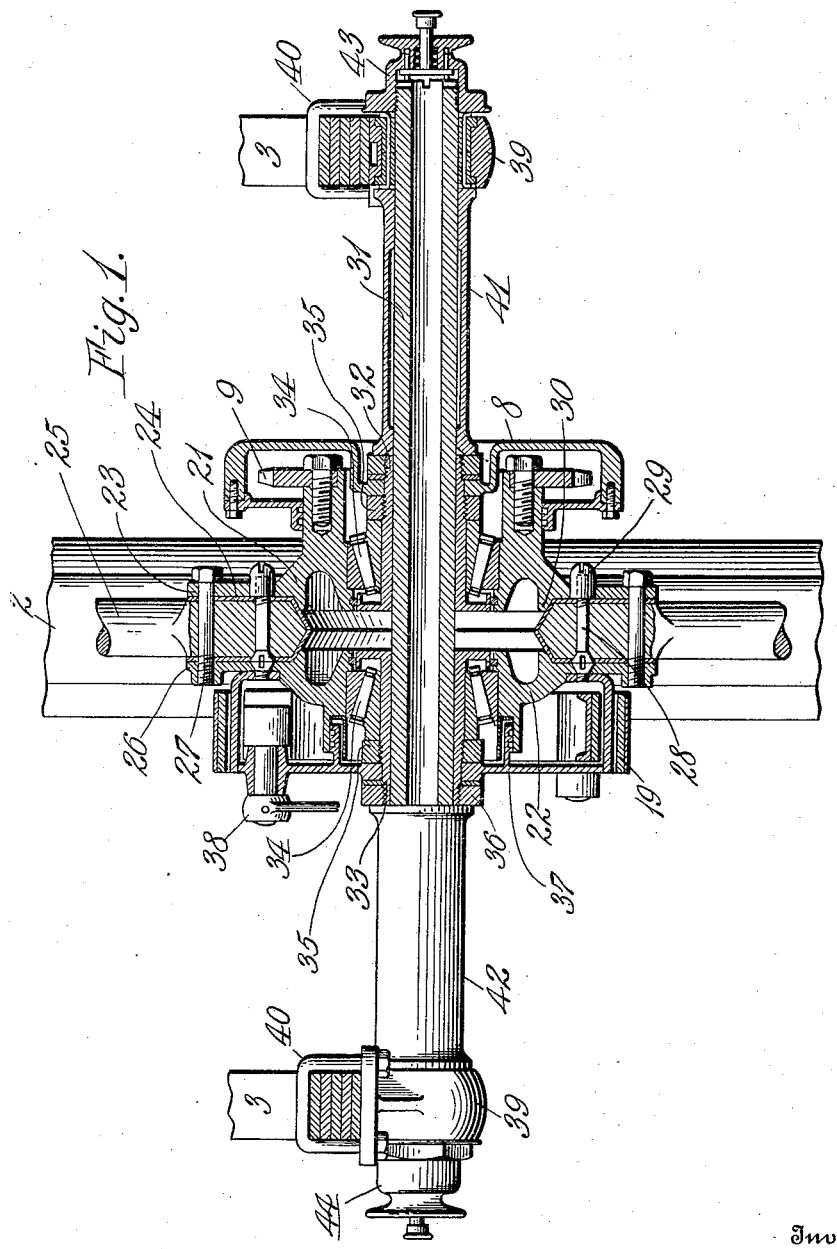
Figure 2:
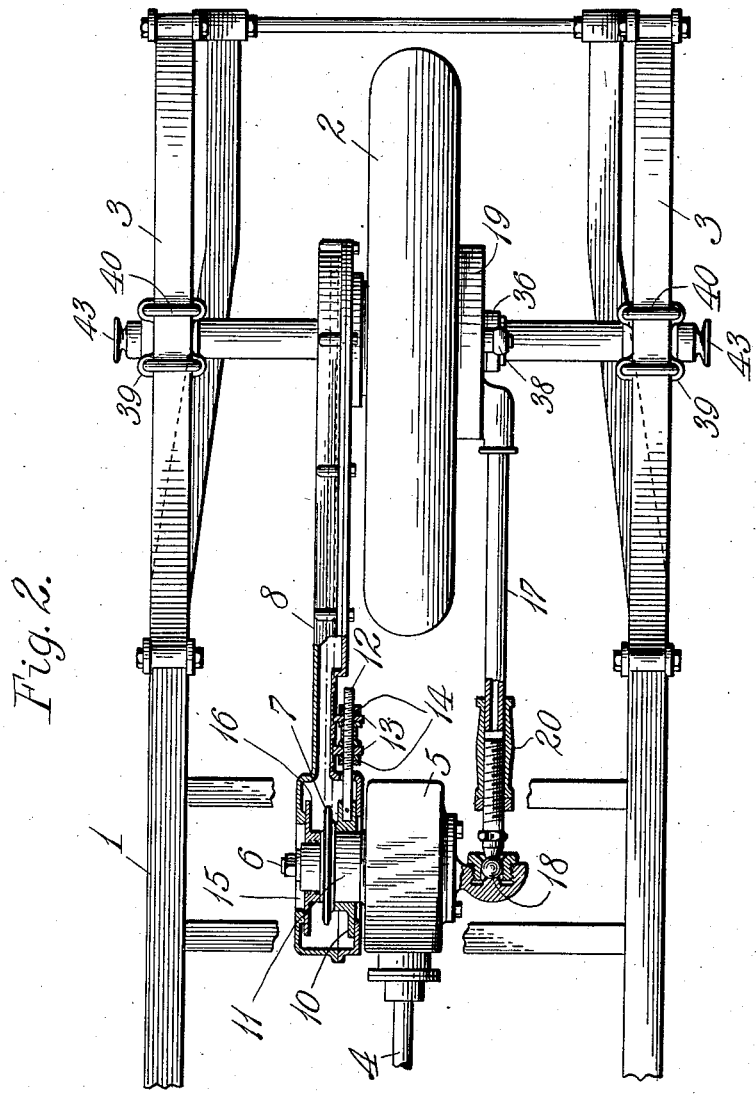

To these ends the invention consists in the matters hereinafter set forth and more particularly pointed out in the appended claims, reference being had to the accompanying drawings in which:

Figure 1 is a vertical section through the hub, rear axle and bearings of a wheel mounting embodying the invention; Fig. 2 is a plan view of the wheel mounting with parts in section to show the construction, and Fig. 3 is a view similar to Fig. 1 showing the parts disassembled for the removal of the wheel.

In Fig. 2 of the drawings the invention is shown for convenience of illustration as applied to a chassis having side members 1 extending rearwardly at each side of the driving wheel 2 and to the rear ends of which members springs 3 of any suitable construction are attached in any desired manner.

A power transmission shaft 4 extends rearwardly from the forward part of the chassis to transmit motion from a motor (not shown) to suitable power transmission mechanism of any desired construction inclosed within a suitable casing 5 attached to cross members of the chassis. A shaft 6 projecting laterally from the casing is provided with a sprocket wheel 7 engaged by a suitable chain which extends rearwardly within a chain casing 8 to a similar sprocket 9 secured to the hub of the driving wheel 2. The rear end of the chain casing 8 is secured to the axle of the wheel 3, and is preferably constructed so as to form a rigid strut or distance member between the axle and the shaft of the power transmitting mechanism.

To give the desired adjustment for the chain casing and take up the slack in the chain, a disk or ring 10 is mounted upon the hub 11 of the casing 5 through which the shaft 6 extends, and attached to this disk and extending rearwardly therefrom, is a rod 12 which passes through lugs 13 on the side of the chain casing and is adjustably held in said lugs by nuts 14 on the rod engaging the lugs. A slot 15 in the side of the casing permits the adjustment of the casing relative to the shaft 6 and this slot is closed by a plate 16 carried by and movable with the shaft.

At the side of the casing 5 and wheel 2 opposite that at which the chain casing is located, is a distance rod 17 which is attached at its forward end to the side of the casing 5 by a universal joint 18 and at its rear end, is rigidly secured to a fixed member of a brake drum 19 carried by the hub portion of the wheel. The distance rod is adjusted as to length, to correspond with the chain casing, by providing said rod with a tubular coupling or turn buckle 20.

The hub of the wheel 2 consists of two side members 21 and 22, the member 21 being formed with an annular flange 23 to lie against one side of a socket ring 24 in which the wooden spokes 25 of the wheel are seated. The hub member 22 is also formed with an annular flange 26 extending outwardly to engage the opposite side of the socket ring and these flanges are detachably secured against the sides of the socket ring and the wheel firmly attached to the hub, by means of bolts 27 passing through the flange 23 and through the socket ring and inner ends of the spokes, into engagement with a screw-threaded opening in the flange 26. The inner ends of the spokes 25 are rigidly secured within the socket ring 24 in which they are seated, by means of a series of screw-bolts 28 having slotted heads which lie flush with one side face of the socket rim and are screw-threaded at their opposite ends to engage internally screw-threaded heads 29 which project laterally from the side of the socket ring through openings 45 provided therefor in the flange 23 and within which openings said heads fit closely. These heads thus aid in firmly holding the hub member 21 to the wheel but do not hinder the removal of the wheel when the bolts 27 are taken out to detach the wheel from the flange 23, as said heads are readily withdrawn from the openings in the flange. The wheel is accurately centered upon the hub by providing each hub member with a shoulder 30 to engage the inner diameter of the socket ring which side of the ring is formed with double inclined faces to engage correspondingly formed seats on the shoulder 30.

A fixed axle upon which the wheel hub turns, consists of an inner hollow shaft 31 and bearing sleeves 32 and 33 mounted thereon, each sleeve being of a length substantially equal to the length of the hub member through which it extends. A roller bearing 34 of any suitable construction is interposed between each sleeve and the adjacent hub member, said bearings being secured to the sleeves in the usual manner by locking rings 35. The rear end of the chain casing 8 is also rigidly secured upon the outer end of the sleeve 32 between the ring 35 and a similar locking ring 36 and the supporting disk 37 which carries the brake levers 38 for the brake drum 19 is secured in a like manner to the outer end of the sleeve 33. The wheel hub comprising the members 21 and 22 thus turns freely upon the roller bearings which are interposed between these members and the fixed sleeves 32 and 33 to which the chain casing and brake drum disk are rigidly secured to firmly hold said sleeves against turning, said disk being rigidly held by the distance rod 17 which is attached thereto.

The inner hollow shaft 31 extends through the sleeves 32 and 33 and projects a considerable distance from each end of the sleeves with its outer ends beneath the springs 3 which are seated thereon and firmly secured thereto by suitable spring seats 39 and clips 40, which are constructed and arranged in the usual manner for securing such springs to a tubular axle.

Tubular spacing members 41 and 42 are interposed between the outer ends of the sleeves 32 and 33 and the spring seats 39 to space said seats from the wheel hub and suitable screw-caps 43 and 44 are provided upon the outer screw-threaded ends of the shaft 31 to engage the outer sides of the seats 39. When these caps are turned up hard against the outer sides of the spring seats they will force said seats toward the wheel hub and thus clamp the spacing sleeves 41 and 42 between them and the ends of the sleeves 32 and 33.

When it is desired to remove the wheel 2 for the purpose of replacing or repairing the tire, it is only necessary, as shown in Fig. 3, to remove the cap 44 on the end of the shaft 31, when said shaft may be pulled longitudinally out of engagement with the sleeve 33. When it is desired to simply detach the wheel, this shaft 31 is only pulled out to the extent shown in Fig. 3, its inner end still being in engagement with the sleeve 32 to form a support for the hub member 21 and the spacing sleeve 41. After drawing the shaft 31 longitudinally to the position described, the bolts 27 are then taken out and the hub members 22 and 23 are thus disconnected from the wheel. When the shaft 31 is pulled out the spacer 42 drops out of the way and therefore the hub member 22 with its brake drum and the sleeve 33 may be moved away from the side of the wheel after the bolts 27 are taken out, the universal joint 18 of the distance rod 17 permitting such movement of said parts, and the distance rod serving to hold the hub member and attached parts so that when they are swung back to place they will come into accurate alinement with the other parts and the reassembling will be greatly facilitated. When the wheel hub member 22 is moved out of the way as described, the wheel may then be moved laterally to disengage the heads 29 from the flange 23, and the wheel will then be free of the hub and axle and may be rolled out through the space between the hub members. In this construction of hub and axle the parts are rigidly held in place and in accurate position and alinement, and at the same time may be quickly and easily disconnected and detached for the purpose of removing the wheel to replace or repair it.

The construction also provides for the carrying of an extra wheel with an inflated tire thereon so that in case of puncture in the tire the wheel may be quickly removed and the spare wheel put in its place.

Obviously the details of construction and arrangement of parts may be changed without departing from the spirit of my invention and I do not limit myself to the particular form of construction shown.

Having thus fully described my invention, what I claim is:—

1. In a vehicle, the combination with a wheel and frame members adapted to be supported by said wheel at each side thereof, of opposed hub members detachably secured to the sides of the wheel, a bearing member in each hub member upon which said hub members are adapted to turn, driving mechanism applied to one of the hub members for turning the wheel, and an axle member upon which the bearing members are sleeved and held against turning, the frame members being supported upon said axle member near its ends.

2. In a vehicle, the combination with a wheel and frame members adapted to be supported by said wheel at each side thereof, of opposed hub members detachably secured to the sides of the wheel, a bearing member in each hub member upon which said hub members are adapted to turn, driving mechanism applied to one of the hub members for turning the wheel, an axle member extending through the bearing members, means for attaching the frame members to the axle member near its ends, and spacing sleeves on the axle member between the hub members and the means for attaching the frame members to the axle member.

3. In a vehicle, the combination with a wheel and a frame adapted to be supported by said wheel, of opposed hub members detachably secured to the sides of the wheel, a bearing sleeve within each hub member removable therewith when the hub member is detached from the wheel, an axle member extending through both of the sleeves, means attached to said sleeves and frame for preventing rotation of said sleeves, and means attached to the ends of said axle member for supporting the frame thereon.

4. The combination of a vehicle wheel having an annular center member, opposed hub members having flanges to engage the annular center member, the flange of one of said members being formed with openings and each member formed with a seat for the annular center member to center the same thereon, means projecting from the side of the annular center member to engage the openings in said flange of the hub member, means for detachably securing the flanges of the hub members to the sides of said annular center member, a non-rotatable sleeve in each hub member, a bearing between each hub member and sleeve, a non-rotatable axle member extending through the sleeves and adapted to be moved longitudinally therethrough for disengagement therefrom, and means for holding said sleeves from turning upon the axle member.

5. In a vehicle, the combination with a wheel and a frame having members extending at each side of the wheel, opposed hub members detachably secured to the sides of the wheel, driving mechanism for turning the wheel operatively connected to one of the hub members, an axle member extending through the hub members and connected at its ends to the frame members, bearing members on the axle member within the hub members and from which said axle member is adapted to be withdrawn, said bearing members being supported by the hub members when the axle member is withdrawn, and distance members connecting the bearing members with the frame.

6. In a propelled vehicle, the combination with a single driving wheel and a frame having members between which said wheel is secured, of a fixed axle comprising bearing sleeves within the hub of the wheel, an axle member extending through said sleeves and removable longitudinally therefrom and spacing sleeves at the outer ends of said bearing sleeves, spring seats at the outer end of the spacing sleeves upon the axle member through which seats said member is longitudinally removable, springs secured upon said seats and attached to the said frame members to secure the ends of the axle to said members, power transmitting means operatively connected to the hub of the wheel to turn said wheel, and a distance member secured at one end to the frame and at its opposite end to the adjacent bearing sleeve.

7. In a propelled vehicle, the combination with a single driving and supporting wheel and a frame having members extending at each side of said wheel, of opposed hub members detachably secured to the sides of the wheel, bearing sleeves within said hub members, an axle member extending through said sleeves and longitudinally removable therefrom, springs secured to the frame members and detachably attached to the ends of said axle member, a sprocket wheel secured to one of the hub members, a chain casing inclosing said wheel and secured to one of the bearing sleeves, and extending to a point of connection with the frame, and a distance member at the opposite side of said wheel connected at one end to the other of said bearing sleeves and at its opposite end to the frame.

8. In a vehicle, the combination with a single driving wheel and a frame having side members extending at each side of the wheel, of opposed hub members engaging opposite sides of the wheel, means for detachably securing said members to the wheel, a bearing sleeve in each hub member, a bearing interposed between each hub member and bearing sleeve therein, an axle shaft extending through said bearing sleeves and longitudinally removable therefrom, spring seats on the outer ends of said shaft and from which said shaft is longitudinally removable, caps on the outer ends of the shaft in engagement with the outer sides of the seats, spacing sleeves on the shaft between the spring seats and the outer ends of the bearing sleeves, springs secured to said seats and frame members a brake drum on one hub member, a brake drum member fixed on the bearing sleeve within said hub member, a distance rod secured at one end to said drum member and having a universal joint connection with the frame at its opposite end, driving mechanism operatively connected to the hub member at the opposite side of the wheel, and a casing for said mechanism secured to the bearing sleeve in said hub member at its rear end and attached to the frame at its forward end.

In testimony whereof I affix my signature in presence of two witnesses.

JAMES SCRIPPS BOOTH.

Witnesses:
 ANNA M. DORR,
 LEWIS E. FLANDERS.

Copies of this patent may be obtained for five cents each, by addressing the "Commissioner of Patents, Washington, D. C."